United States Patent
Zhou

(10) Patent No.: US 10,048,771 B2
(45) Date of Patent: Aug. 14, 2018

(54) METHODS AND DEVICES FOR CHINESE LANGUAGE INPUT TO A TOUCH SCREEN

(75) Inventor: Tian-Yang Zhou, Nanjing (CN)

(73) Assignee: Google Technology Holdings LLC, Mountain View, CA (US)

( * ) Notice: Subject to any disclaimer, the term of this patent is extended or adjusted under 35 U.S.C. 154(b) by 1081 days.

(21) Appl. No.: 13/978,905

(22) PCT Filed: Jan. 12, 2011
(Under 37 CFR 1.47)

(86) PCT No.: PCT/CN2011/070203
§ 371 (c)(1),
(2), (4) Date: May 5, 2014

(87) PCT Pub. No.: WO2012/094811
PCT Pub. Date: Jul. 19, 2012

(65) Prior Publication Data
US 2014/0317569 A1 Oct. 23, 2014

(51) Int. Cl.
*G06F 3/01* (2006.01)
*G06F 3/0481* (2013.01)
(Continued)

(52) U.S. Cl.
CPC ............ *G06F 3/018* (2013.01); *G06F 3/0482* (2013.01); *G06F 3/04817* (2013.01); *G06F 3/04842* (2013.01); *G06F 3/04886* (2013.01)

(58) Field of Classification Search
None
See application file for complete search history.

(56) References Cited

U.S. PATENT DOCUMENTS

| 6,170,000 B1 * | 1/2001 | Bories | G06F 3/018 345/171 |
| 6,562,078 B1 * | 5/2003 | Yang | G06F 3/018 341/23 |

(Continued)

FOREIGN PATENT DOCUMENTS

| CN | 101303627 A | 11/2008 |
| CN | 101539837 A | 9/2009 |
| CN | 101620500 A | 1/2010 |

OTHER PUBLICATIONS

Thedroidgeek: https://www.youtube.com/watch?v=-Fz7PbehP4s Feb. 9, 2010 (Year: 2010).*

(Continued)

*Primary Examiner* — Taghi T Arani
*Assistant Examiner* — FJ Farhadian
(74) *Attorney, Agent, or Firm* — Lerner, David, Littenberg, Krumholz & Mentlik, LLP

(57) ABSTRACT

Disclosed are methods and devices for Chinese language input to a touch screen. A method can include displaying pinyin "initials" on the touch screen and sensing a touch input at a first position of the touch screen. If the touch input is continuously sensed at the first position for a predetermined period of time, the method can include determining a pinyin "initial" and then discontinuing displaying the pinyin "initials" and displaying pinyin "finals" on the touch screen. By sensing a removal of the touch input from the touch screen at a second position, a selected "final" is determined. The method can also include displaying at least one Chinese character on the touch screen based upon the selected "initial" and the selected "final."

14 Claims, 5 Drawing Sheets

(51) Int. Cl.
    *G06F 3/0482* (2013.01)
    *G06F 3/0484* (2013.01)
    *G06F 3/0488* (2013.01)

(56) References Cited

U.S. PATENT DOCUMENTS

| | | | | |
|---|---|---|---|---|
| 6,809,725 | B1* | 10/2004 | Zhang | G06F 3/018 345/171 |
| 7,245,290 | B2* | 7/2007 | Sugano | G06F 3/018 345/169 |
| 7,505,627 | B2* | 3/2009 | Chang | G06F 3/04883 382/181 |
| 2005/0049861 | A1* | 3/2005 | Sugano | G06F 3/018 704/231 |
| 2005/0052431 | A1* | 3/2005 | Chang | G06F 3/018 345/173 |
| 2005/0209844 | A1* | 9/2005 | Wu | G06F 17/2223 704/2 |
| 2005/0275632 | A1* | 12/2005 | Pu | G01C 21/3611 345/171 |
| 2007/0052682 | A1* | 3/2007 | Kang | G06F 3/0236 345/173 |
| 2008/0180403 | A1* | 7/2008 | Park | G06F 3/0237 345/173 |
| 2009/0073137 | A1* | 3/2009 | Gao | G06F 3/0237 345/173 |
| 2010/0100849 | A1* | 4/2010 | Fram | G06F 3/0236 715/835 |
| 2011/0061029 | A1* | 3/2011 | Yeh | G06F 3/04883 715/863 |
| 2011/0099506 | A1* | 4/2011 | Gargi | G06F 3/0234 715/773 |
| 2012/0053887 | A1* | 3/2012 | Nurmi | G06F 3/0485 702/150 |
| 2012/0119997 | A1* | 5/2012 | Gutowitz | G06F 3/0219 345/168 |
| 2017/0083109 | A1* | 3/2017 | Li | G06F 3/04886 |

OTHER PUBLICATIONS

Patent Cooperation Treaty, "International Search Report" for Int'l Pat. Appln. No. PCT/CN2011/070203, Apr. 7, 2011, 11 pages.

\* cited by examiner

METHODS AND DEVICES FOR CHINESE LANGUAGE INPUT TO A TOUCH SCREEN

FIELD

Disclosed are methods and devices for Chinese language input to a touch screen.

BACKGROUND

Many electronic devices include touch screens for input. Such devices include, for example, a mobile communication device which may be implemented as a cellular telephone (also called a mobile phone). Mobile communication devices represent a wide variety of devices that have been developed for use within various wireless networks. Such communication devices include, for example, cellular telephones, messaging devices, personal digital assistants (PDAs), notebook or laptop or tablet computers incorporating communication modems, mobile data terminals, application specific gaming devices or remote controllers, video gaming devices incorporating wireless modems, and the like.

A touch screen with a display, such as a Liquid Crystal Display (LCD), can include capacitive or resistive circuitry to map touch input. A touch screen has a display layer and a touch-sensitive layer. A touch screen can display or annunciate one or more icons which (when selected by a user through touch input) can invoke, for example, an application or feature of the device. Handheld electronic devices in particular have touch screen size constraints and therefore, often, multiple successive screens are used to capture certain types of input.

There is an opportunity to improve Chinese language input in electronic devices with touch screens. The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
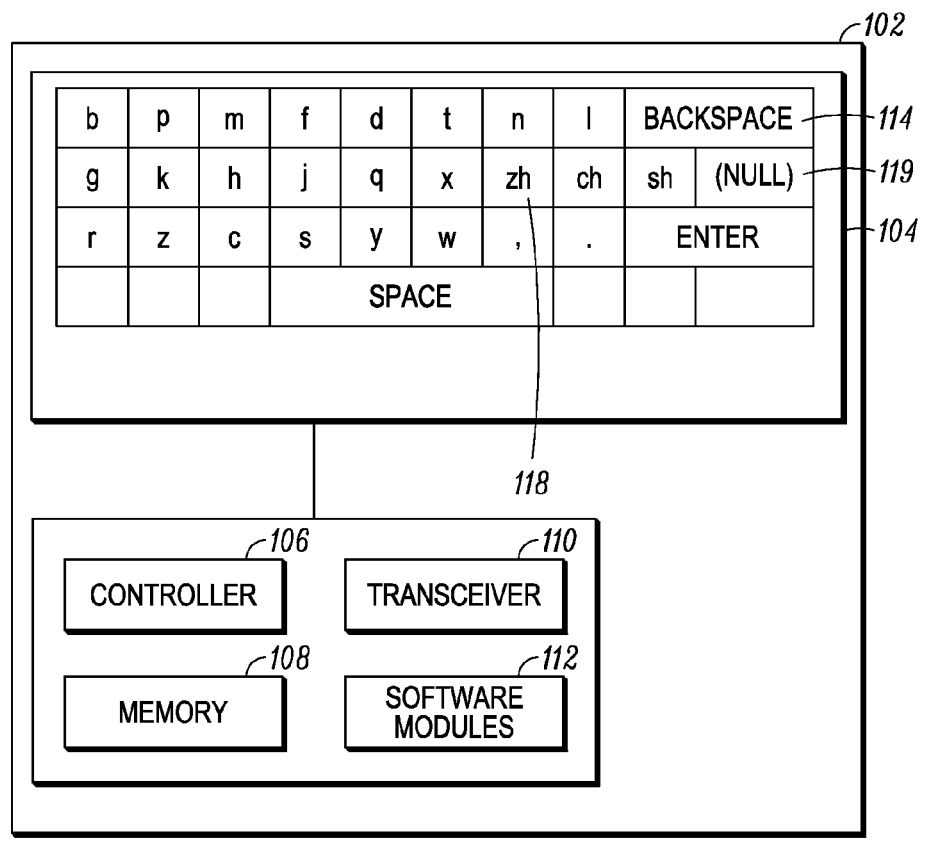
FIG. 1 depicts an embodiment of an electronic device including a touch screen, a controller, and a memory.

Pinyin is a system that uses Roman letters to linguistically denote the pronunciation of one or more Chinese characters. One pinyin word usually has two parts and optionally a tone designation. A first part is referred to as an "initial" which most often includes a consonant. The set of "initial" consonants is: b, p, m, f, d, t, n, l, g, k, h, j, q, x, zh, ch, sh, r, z, c, s, y, and w. Infrequently, a pinyin word does not have an "initial" and a "null" initial is proposed for these situations. A second part, referred to as a "final," most often includes vowels and can optionally include ending consonants. The set of "finals" is: a, o, e, i, u, v, ai, ei, ui, ao, ou, iu, ie, ve, er, an, en, in, un, vn, ang, eng, ing, ong, ia, iao, iu, ian, iang, iong, ua, uo, uai, uan, uang, and ueng. Certain "initials" map only to particular subsets of the set of "finals." Just as in other languages, the Chinese language includes homonyms where certain words that sound the same (or nearly the same) can have several disparate meanings. A tone can also be associated with a combination of an "initial" and a "final", and the addition of a tone reduces the number of homonyms available for any particular pinyin word.

The written Chinese language includes thousands of characters. Chinese language speakers can use pinyin to more easily input the Chinese language for applications and communication in electronic devices. In the past, users have typed pinyin words one letter at a time (using standard keyboards, compact keypads, virtual keypads on touch screens, and the like). After a pinyin word is completely entered, Chinese characters associated with the pinyin word are presented to the user. The user then selects the desired Chinese character.

To reduce the amount of time necessary to input Chinese pinyin with a touch screen, the disclosed devices and methods include displaying a first screen including pinyin "initials" on the touch screen and sensing a touch input at a first position of the touch screen. If the touch input is continuously sensed at the first position for a predetermined period of time, the method can include determining a pinyin "initial", discontinue displaying the pinyin "initials" and then displaying a second screen of pinyin "finals" on the touch screen. By sensing a removal of the touch input from the touch screen at a second position, a selected "final" is determined. The method can also include displaying at least one Chinese character on the touch screen based upon the selected "initial" and the selected "final."

Accordingly, when the disclosed device and method of the device receives a particular touch input to select an "initial," the information displayed on the touch screen changes to "finals." The user may need to slide his or her finger (or a pointer, stylus, or other type of pointing device) to select a "final." The device will then receive input to select a "final" when the device senses the removal of touch input. Optionally, the process can include a third screen of tone information, or can provide tone selection icons on the first and/or second screen.

Figure 2:
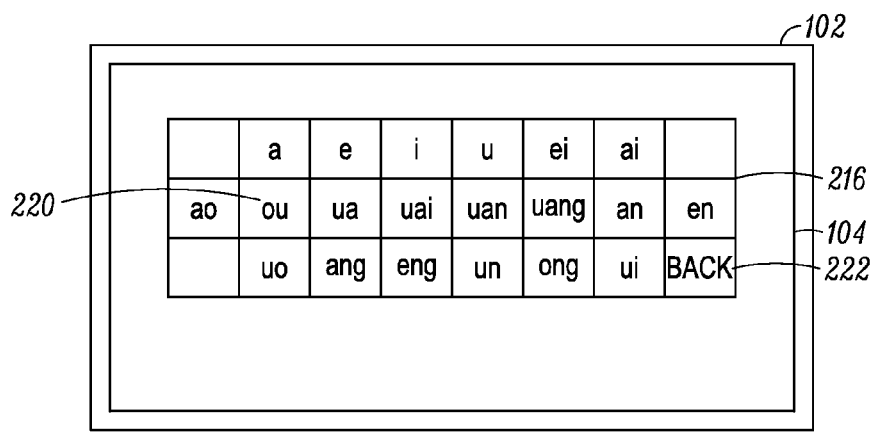
FIG. 2 shows the electronic device of FIG. 1 with a second touch screen display.

FIG. 1 depicts an embodiment of an electronic device 102 including a touch screen 104, a controller 106, and a memory 108. To illustrate the disclosed method, FIG. 2 shows a different touch screen display for the touch screen 104 of the electronic device 102 of FIG. 1. The electronic device 102 may be a communication device that includes, for example, a transceiver 110. Software modules 112 can carry out certain processes of the methods as described herein. Steps of methods may involve modules, and modules may be inferred by the methods discussed herein. The modules can be implemented in software, such as in the form of one or more sets of prestored instructions, and/or hardware, which can facilitate the operation of the mobile station or electronic device as discussed. The modules may be installed at the factory or can be installed after distribution by, for example, a downloading operation. The operations in accordance with the modules will be discussed in more detail below.

The memory 108 can store first pinyin data that can be annunciated as first icons 114 representing "initials" of the pinyin system on the touch screen 104. Briefly referring to FIG. 2, as will be discussed in more detail below, the memory 108 can store second pinyin data to be annunciated as a second set of icons 216 (see FIG. 2) on the touch screen 104. If a touch input is continuously sensed at first position 118 (in this example, the position of the icon for the "zh" pinyin initial) for a predetermined period of time, such as 500 milliseconds, the controller 106 considers the corresponding icon as selected and places the selected "initial" into a buffer memory. Upon the selection of an "initial" icon at position 118, which in this example is "zh," the controller 106 will direct the touch screen 104 to discontinue the annunciation of the first set of icons 114 and annunciate the second set of icons (see FIG. 2). In summary, the touch screen 104 is configured to annunciate the first set of icons 114, sense a touch input at a first position (for example, position 118) on the touch screen 104, annunciate the second set of icons 216 (see FIG. 2), and sense a removal of the touch input at a second position on the touch screen 204. Note that the first position and the second position may be the same physical location, but in most situations it is expect that the user will slide or drag his or her finger from the first position to the second position.

In a few circumstances, there are some Chinese characters that do not have an "initial." The "null" icon 119 in FIG. 1 is a dummy "initial" to input those special Chinese characters that do not have an "initial." The "null" icon 119 behaves in the same manner as the other "initials" and thus is considered a special "initial".

FIG. 2 shows an embodiment of the electronic device 102 of FIG. 1 having the same touch screen 104 but with a different display output. As discussed above, the touch screen 104 is directed to discontinue the annunciation of the first set of icons 114 (see FIG. 1) on the touch screen 104 and annunciate the second set of icons 216 when the touch input is continuously sensed at the first position (e.g., position 118) for a predetermined period of time. The touch screen 104 can sense a removal of the touch input at a second position, for example position 220, on the touch screen 104. In this way, the controller 106 can determine a selected second icon from the second position; and then direct the touch screen 204 to display one or more Chinese characters based on the selected first icon of the first position 118 and the selected second icon of the second position 220.

The high level process therefore includes that the touch screen first display "initials." A user touches an "initial" icon but his or her finger does not leave the display screen. Upon touching for a predetermined period of time, the touch screen displays "finals." The user may slide his or her finger to the desired "final" icon and then leave the display screen. This sequence of events will select an "initial" and a "final" to form a full pinyin word. If the pinyin word is valid, the touch screen displays Chinese characters associated with the pinyin word for the user to select.

FIG. 2 shows particular "finals" which are a subset of the full range of "finals." In the pinyin system, certain combinations are possible, but not all combinations form valid pinyin words. Therefore, the "finals" shown can be limited to the subset of "finals" that validly may follow the selected "initial." In another embodiment, the full set of "finals" can be displayed. In another embodiment, a layout of the full set of "finals" may include non-selectable blank spaces (or grayed-out icons) for "finals" not available for use with a selected "initial." In this way, a user can become familiar with the positions of particular "finals" because the overall layout of the full set of "finals" does not change, and each icon of the second set of icons is consistently annunciated at a predetermined location on the touch screen.

In addition to "initials" and "finals", the pinyin system optionally uses tones, where certain tones map into combinations of "initials" and "finals." It is understood that any manner in which to select tones is within the scope of this discussion. Two specific examples of tone selection will be described later. Moreover, it is understood that any manner in which to display one or more groups of "initial" icons and one or more groups of "final" icons is within the scope of this discussion. For example, certain "initials" and/or "finals" and/or tones may be displayed based using predictive text entry schemes.

For error correction, a delete or "back" icon 222 can be included along with the "finals" icons which, when selected, can direct the touch screen 104 to annunciate the "initial" icons 114 and clear the previously-selected initial (e.g., "zh") from the buffer memory. It is further understood that any manner in which to provide for error correction is within the scope of this discussion, and FIG. 3 describes an alternate method for error correction.

Figure 3:
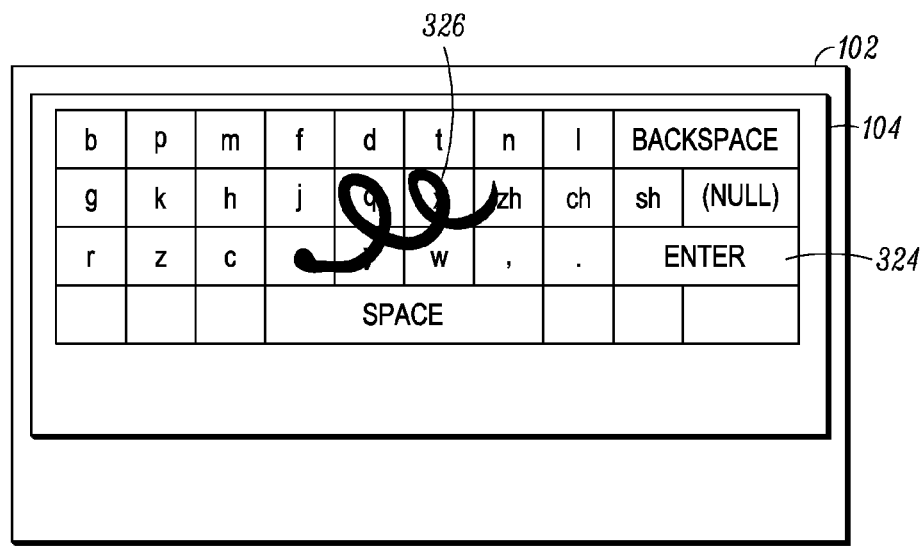
FIG. 3 depicts an embodiment of a method of error correction on the electronic device of FIG. 1.

FIG. 3 depicts an embodiment of icons 324 displayed on the touch screen 104 of the electronic device 102 of FIG. 1 which illustrates another embodiment of a method of error correction. If a user touches an "initial" and then realizes that the wrong "initial" was selected, the user can throw away (or cancel) the selected "initial" by drawing a special error correction pattern 326. For example, a special error correction pattern 326 may made by drawing two loops. If the device 102 detects the special pattern when awaiting selection of a "final" icon, it can cancel the currently displayed icons and display the first icons the touch screen 104. A special pattern may be selected so that a normal drag on the second screen does not trigger the error correction. Note that the screen may have changed from the first set of icons 324 to a second set of icons while the special error correction pattern 326 is being drawn.

Figure 4:
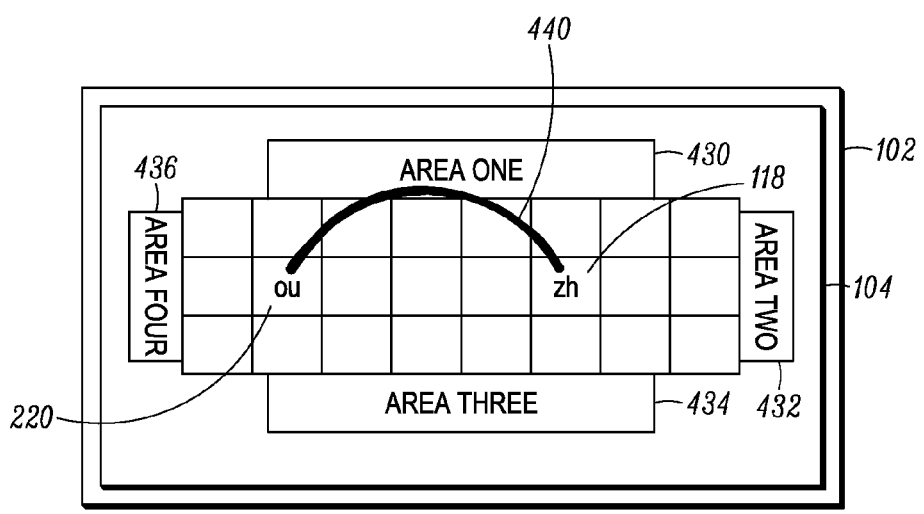
FIG. 4 depicts icons selected from both "initial" icons and "final" icons that would be displayed on separated screens as well as an embodiment of a method to select a tone.

FIG. 4 depicts icons selected from both "initial" icons and "final" icons that would be displayed on separated screens as well as illustrates an embodiment of a method to select a tone. That is, FIG. 4 shows three separate selections, an "initial" icon selection, a "final" icon selection, and a "tone" selection, that can be input to the device 102 with one touch input. There may be between one and five different tones that can be selected based upon the "initial" icon selected and/or the combination of "initial" and "final" icons. In this example, since the "zh" icon at position 118 has been selected from the "initial" icon screen (see FIG. 1), the method can include four possible tone regions, 430, 432, 434 and 436 as areas annunciated on the touch screen 104. If the user drags 440 the touch input from an "initial" position 118 passing through one of the tone areas, such as tone area one 430, and then releases the touch input at a position 220 of a "final" icon (see FIG. 2), the controller can combine the three inputs (all interpreted from the single touch input) to generate at least one Chinese character representing "zh-ou" with the first tone (i.e., zhou1). In yet another embodiment, a method can include processing the tone after receiving the selected "final" icon input. It is understood that any manner in which to provide tone selection is within the scope of this discussion.

Figure 5A:
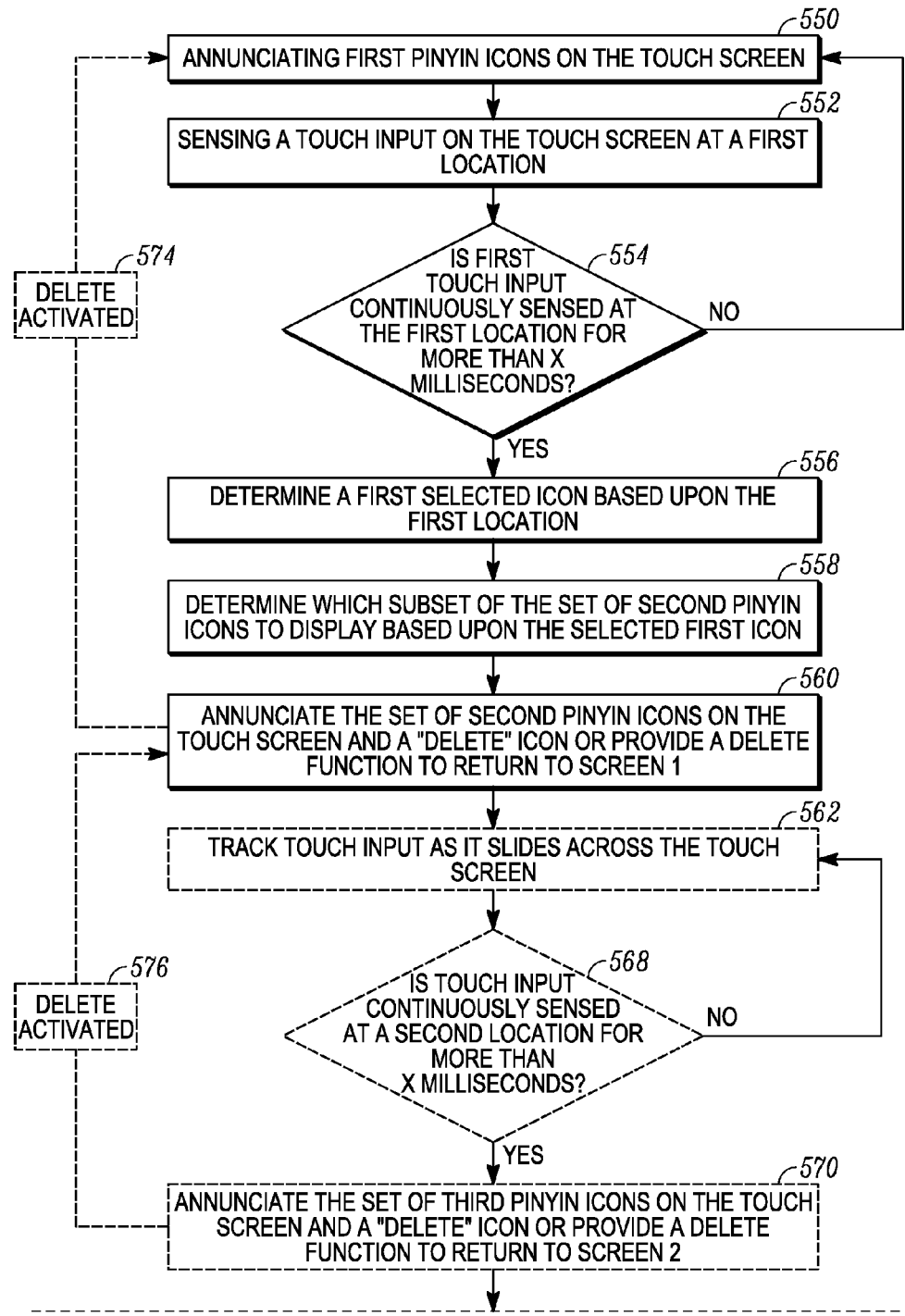
FIG. 5 depicts a flowchart of an embodiment of a method for Chinese language input for a touch screen.
Figure 5B:
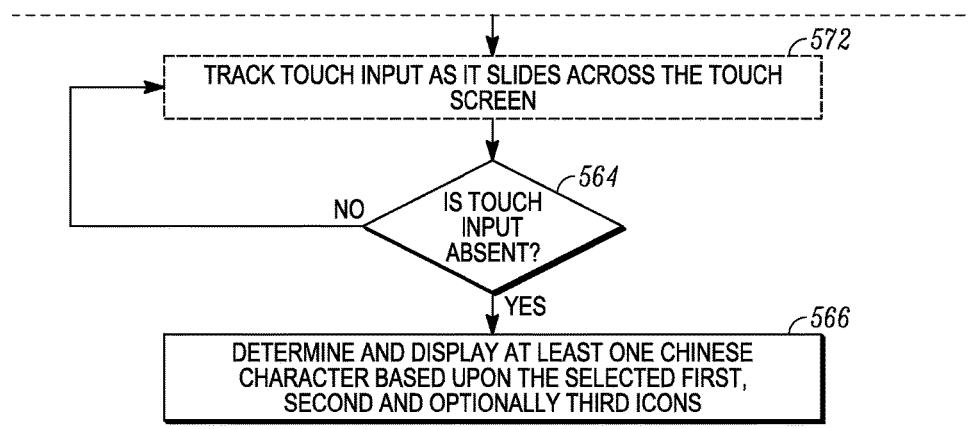

FIG. 5 depicts a flowchart of an embodiment of a method for Chinese language input for a touch screen. Upon annunciating 550 first icons or "initial" icons representing first pinyin data on the touch screen, the method includes sensing 552, by the touch screen processor, a touch input at a first position on the touch screen. If the touch input is continuously sensed 554 at the first position for a predetermined period of time, then the controller can determine 556 a selected first icon based on the first position. If not, the controller can direct the touch screen to continue to annunciate 550 the first pinyin icons.

After determining 556 the first icon, the controller can determine 558 which subset of the set of second pinyin icons to display based upon the selected first icon, discontinue the step of annunciating a first set of icons, and annunciate 560 a second set of icons representing second pinyin data on the touch screen. As mentioned previously, the second set of icons in step 560 can be the full set of pinyin "finals" or only the subset of "finals" that can validly follow the selected first icon. If the location of a selected "final" icon is in a different location on the touch screen than the first location on the touch screen, the touch input may be tracked 562 as the touch input slides across the touch screen.

Jumping ahead in the flowchart of FIG. 5, the method includes sensing 564 a removal of the touch input from the touch screen at a second position on the touch screen. The controller determines a selected second icon based on the second position. Based upon at least the selected first and second icons, the controller can determine 566 at least one Chinese character based on the selected pinyin icons and can direct the touch screen to display the valid Chinese characters associated with the pinyin word.

As mentioned previously, it is understood that any manner for providing tone selection is within the scope of this discussion. Tone selection can be an option which is selected by a user prior to invoking the described methods, or later, or may be a default setting. For example, as illustrated in FIG. 5, a method to provide tone selection can include determining 568 whether the touch input at the second location, that is, selecting a "final" icon, is continuously sensed for more than a predetermined period of time. The method can further include annunciating 570 a set of third pinyin icons on the touch screen. The set of third pinyin icons can be the full set of pinyin tones (1, 2, 3, 4, 5) or a subset of pinyin tones that is valid for the selected "initial" and selected "final". The method tracks 572 the touch input as it slides across the touch screen, and then determines 564 where the touch input ends (i.e., becomes absent). The location of the touch input removal indicates the selected third (tone) icon. In this optional subroutine, the method can include displaying at least one Chinese character on the touch screen based upon the selected first, second, and third icons.

An alternate method for receiving a tone selection in accordance with FIG. 4 can be implemented using the tracking step 562 of FIG. 5. If the method tracks 562 the movement of the touch input between the determination 556 of the initial icon and the selection of the final icon, the passage of the touch input through a tone icon can be determined. If the touch input passes through more than one tone icon, the last tone icon passed-through can be determined as the selected tone icon.

It is also understood that any manner in which to provide error correction is within the scope of this discussion. FIG. 5 depicts a "delete" icon or a delete function provided at steps 560 and/or 570. If the "delete" icon or a delete function is selected, an error correction step 574 and/or 576 is performed, and the process can cycle back to the respective proceeding step 550 or 570. Note that if the delete function is implemented using a touch input pattern such as the pattern 326 shown in FIG. 3, then tracking step 562 can be used to detect the special error correction pattern as it is being performed by the user.

Figure 6:
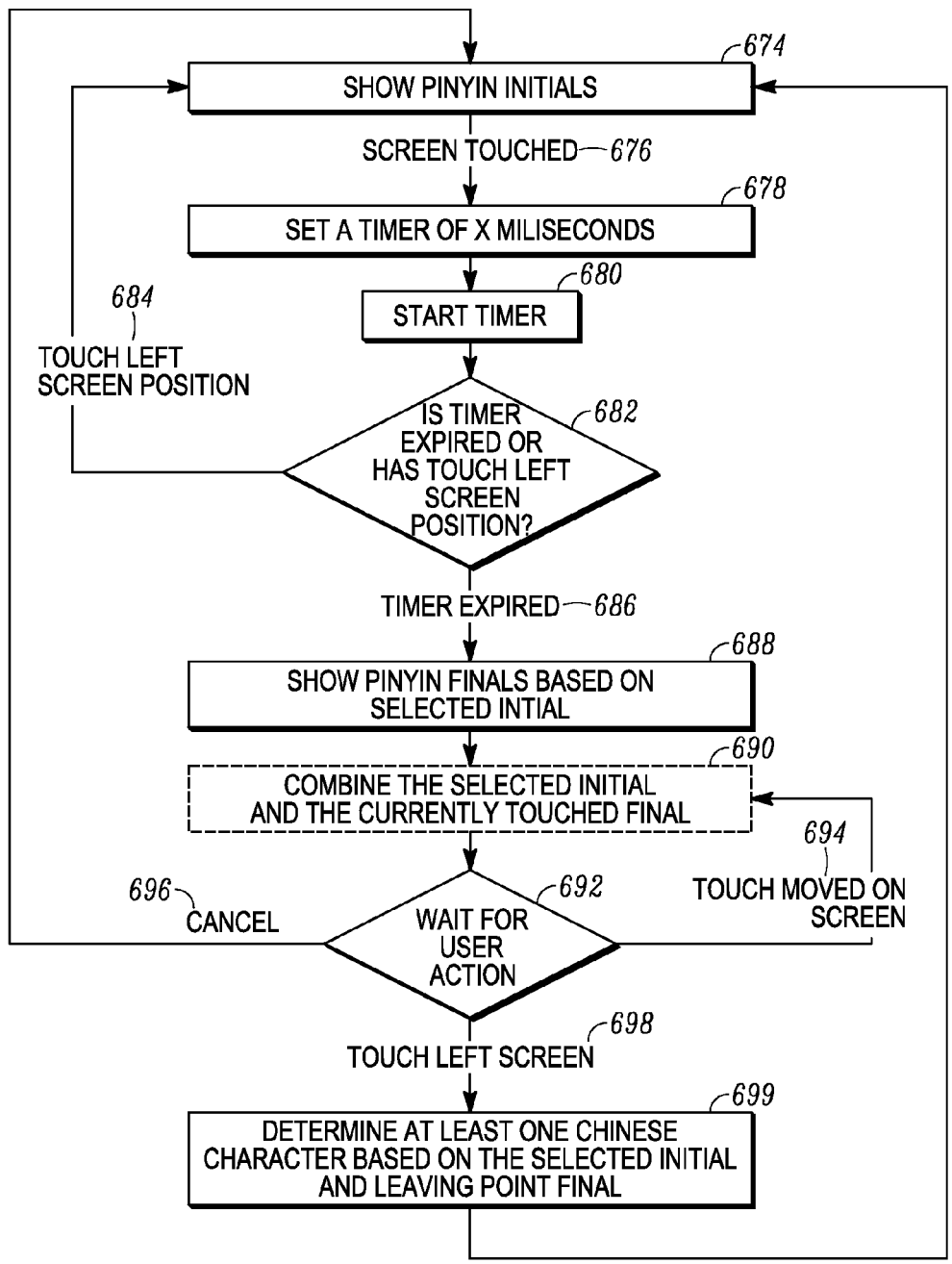
FIG. 6 depicts a flow chart of an embodiment of the described methods.

FIG. 6 depicts a flow chart of an embodiment of the described methods. As discussed above, the first screen shows 674 pinyin "initials." A user may then provide input to the touch screen 676 at a particular location of the touch screen in any suitable manner, such as with a stylus or finger. A timer of X milliseconds can be set 678. As mentioned, X may be 500 milliseconds. X is a parameter that could any number greater than zero. On the other hand, if X is equal to zero, the timer would expire immediately, which means that a screen transition could happen immediately. In any case, the timer can start 680 to determine if the user's input is intended to select a particular "initial."

A determination 682 can be made as to whether the timer has expired, or the touch input has left the screen or moved to a different position on the screen too quickly to select an "initial." If the touch input has left the screen or moved to a different position on the screen 684 prior to the timer expiring, the pinyin "initials" will continued to be displayed 674. That is, if the user did not have a stable touch on an "initial" icon for a timeout period, e.g., 500 milliseconds, the processor considers the touch action invalid and the process can return to step 674. However, if the user has continued to provide touch input while the timer expires 686, then the display screen can show 688 pinyin "finals", and in one embodiment, based upon the selected "initial." That is, in memory, the device can store an available "finals" list for each "initial" and, in one embodiment, only display available "finals" for the selected "initial".

While the user continues to provide touch input, the method can optionally include combining 690 the selected "initial' and the currently touched "final". When combining 690, the device can show the "initial" and the "final" together at the cursor's position, and optionally display one or more Chinese character candidates in a popup window. In another embodiment, the created text of Chinese characters may be concurrently displayed with the pinyin "initials" and "finals," and one or more new Chinese character candidates can be displayed in the text while there is user action 692.

The user's action 692 can then be determined. In one possible action, the device can continue to sense user input such as moving 694 a stylus or finger on the touch screen if the removal of the touch input is not sensed. In this case, the device can continue the step of dynamically combining 690 the selected "initial" and the currently touched "final." On the other hand, user action 692 may be a cancel action 696 such as selecting a "back" icon by removing the touch input as discussed above. For example, if the user drags his or finger from the "initial" icon to the "backspace" icon, the device can cancel the first "initial" and return to step 674. Another possible user action 692, as discussed above, may include removing the touch input from the touch screen, that is the stylus or finger leaving the screen 698, so that device can sense a removal of the touch input from the touch screen. In this case, the device can determine 699 at least one Chinese character based on the selected "initial" and the leaving point "final." In one embodiment, the device can select the best candidate, based on, for example, context, and insert the selected Chinese character at the cursor's position. The user can modify the device's choice by selecting from a candidate list. After step 699, the device can return to step 674 to input the next Chinese character.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method of an electronic device including a touch screen, a controller, and a memory, the method comprising:
    annunciating a first set of icons representing first pinyin data on the touch screen;
    sensing, by the touch screen, a touch input at a first position on the touch screen, the first position associated with a keyboard;
    prior to sensing a removal of the touch input, annunciating a plurality of areas of the touch screen outside of the first position and outside the associated keyboard, each one of the plurality of areas corresponding to a tone associated with the first position, such that a first area among the plurality of areas is associated with a first tone and a second area among the plurality of areas is associated with a second tone that is different from the first tone:
    if the touch input is continuously sensed at the first position for a predetermined period of time,
        determining, by the controller, a selected first icon based on the first position,
        discontinuing the step of annunciating a first set of icons, and annunciating a second set of icons representing second pinyin data on the touch screen;
    sensing the removal of the touch input from the touch screen at a second position on the touch screen;
    determining, by the controller, a selected second icon based on the second position,
    wherein the controller executes one or more modules that configure the device to:
        detect that the touch input moves from the first position to the second position while passing through one of the plurality of areas and without being removed from the touch screen,
        store data of the selected first icon in the memory upon expiration of the predetermined period of time, and
        clear the data of the selected first icon from the memory when a predetermined movement is performed on the touch screen before removal of the touch input from the screen; and
    displaying at least one Chinese character on the touch screen based upon the selected first icon, the tone associated with the one of the areas and the selected second icon and in response to sensing the removal of the touch input, such that the at least one Chinese character is displayed in response to a single touch input that indicates a first icon, a tone, and a second icon.

2. The method of claim 1 wherein the first pinyin data represent pinyin initials.

3. The method of claim 1 wherein the second pinyin data represent pinyin finals.

4. The method of claim 1 wherein the touch screen senses a slide movement of the touch input.

5. The method of claim 1 wherein the second position is the same as the first position.

6. The method of claim 1 wherein the second position is different than the first position.

7. The method of claim 1 wherein the second set of icons is selected based upon the selected first icon.

8. The method of claim 1, wherein the second set of icons includes a "backspace" icon and:
    if the selected second icon is the "backspace" icon, then returning to the step of annunciating the first set of icons.

9. The method of claim 1, wherein each icon of the second set of icons is consistently annunciated at a predetermined location on the touch screen.

10. An electronic device comprising:
    a memory configured to:
        store first pinyin data to be annunciated as a first set of icons on a touch screen; and
        store second pinyin data to be annunciated as a second set of icons on the touch screen;
    a touch screen module configured to:
        annunciate the first set of icons;
        sense a touch input at a first position on the touch screen, the first position associated with a keyboard;
        annunciate a plurality of areas of the touch screen outside of the first position and outside the associated keyboard, each one of the plurality of areas corresponding to a tone associated with the first position, such that a first area among the plurality of areas is associated with a first tone and a second area among the plurality of areas is associated with a second tone that is different from the first tone;
        annunciate the second set of icons; and
        sense a removal of the touch input at a second position on the touch screen;
    a controller configured to:
        prior to sensing a removal of the touch input:
            determine a selected first icon from the first position, if the touch input is continuously sensed at the first position for a predetermined period of time;
            direct the touch screen to discontinue the annunciation of the first set of icons on the touch screen and annunciate the second set of icons, if the touch input is continuously sensed at the first position for a predetermined period of time;
sense the removal of the touch input;
determine a selected second icon from the second position;
wherein the controller executes one or more modules that configure the device to:
 detect that the touch input moves from the first position to the second position while passing through one of the plurality of areas,
 store data of the selected first icon in the memory upon expiration of the predetermined period of time, and
 clear the data of the selected first icon from the memory when a predetermined swiping movement is performed on the touch screen before removal of the touch input from the screen; and
display at least one Chinese character on the touch screen based upon the selected first icon, the tone associated with the one of the areas and the selected second icon and in response to sensing the removal of the touch input, such that the at least one Chinese character is displayed in response to a single touch input that indicates a first icon, a tone, and a second icon.

11. The electronic device of claim 10 wherein the memory comprises:
 a plurality of second sets of icons.

12. The electronic device of claim 10, wherein the second set of icons includes a "backspace" option.

13. The method of claim 1, wherein the predetermined movement indicates returning to annunciating the first set of icons.

14. The electronic device of claim 10, wherein the predetermined movement indicates annunciating the first set of icons.

* * * * *